United States Patent
Douady et al.

(10) Patent No.: US 11,729,364 B2
(45) Date of Patent: Aug. 15, 2023

(54) CIRCULAR STITCHING OF IMAGES

(71) Applicant: GoPro, Inc., San Mateo, CA (US)

(72) Inventors: Bruno César Douady, Orsay (FR); Alexis Lefebvre, Paris (FR)

(73) Assignee: GoPro, Inc., San Mateo, CA (US)

( * ) Notice: Subject to any disclaimer, the term of this patent is extended or adjusted under 35 U.S.C. 154(b) by 385 days.

(21) Appl. No.: 17/018,679

(22) Filed: Sep. 11, 2020

(65) Prior Publication Data

US 2021/0084281 A1 Mar. 18, 2021

Related U.S. Application Data

(60) Provisional application No. 62/901,918, filed on Sep. 18, 2019.

(51) Int. Cl.

| | |
|---|---|
| *H04N 13/156* | (2018.01) |
| *H04N 13/239* | (2018.01) |
| *G06T 7/593* | (2017.01) |
| *G06T 3/40* | (2006.01) |
| *H04N 23/45* | (2023.01) |

(52) U.S. Cl.
CPC ......... *H04N 13/156* (2018.05); *G06T 3/4038* (2013.01); *G06T 7/593* (2017.01); *H04N 13/239* (2018.05); *H04N 23/45* (2023.01); *G06T 2207/20221* (2013.01); *G06T 2207/20224* (2013.01)

(58) Field of Classification Search
CPC .. H04N 13/156; H04N 13/239; H04N 5/2258; H04N 5/23238; G06T 3/4038; G06T 7/593; G06T 2207/20221; G06T 2207/20224
See application file for complete search history.

(56) References Cited

U.S. PATENT DOCUMENTS

| | | | |
|---|---|---|---|
| 6,985,619 B1 | 1/2006 | Seta | |
| 8,619,082 B1 | 12/2013 | Ciurea | |
| 8,970,675 B2 | 3/2015 | Morioka | |
| 9,639,935 B1* | 5/2017 | Douady-Pleven | ..... H04N 19/90 |
| 10,353,191 B2* | 7/2019 | Anthony | ............ H04N 1/00018 |
| 10,477,064 B2 | 11/2019 | Douady-Pleven | |
| 2006/0204040 A1 | 9/2006 | Freeman | |
| 2012/0105597 A1 | 5/2012 | Tajiri | |
| 2014/0369584 A1 | 12/2014 | Fan | |

(Continued)

*Primary Examiner* — Edward F Urban
*Assistant Examiner* — Wassim Mahrouka
(74) *Attorney, Agent, or Firm* — Young Basile Hanlon & MacFarlane, P.C.

(57) ABSTRACT

Systems and methods are disclosed for circular stitching of images. For example, methods may include accessing a first image captured using a first image sensor; accessing a second image captured using a second image sensor; determining a cost table for a circular stitching boundary that includes overlapping regions of the first image and the second image; determining an extended disparity profile based on a periodic extension of the cost table and a smoothness criterion, wherein the extended disparity profile has a length greater than the width of the cost table; determining a binocular disparity profile of a length equal to the width of the cost table based on a contiguous subsequence of the extended disparity profile; and stitching the first image and the second image using the binocular disparity profile to obtain a combined image.

20 Claims, 9 Drawing Sheets

(56) References Cited

U.S. PATENT DOCUMENTS

| | | |
|---|---|---|
| 2015/0042767 A1 | 2/2015 | Ciurea |
| 2015/0254868 A1 | 9/2015 | Srikanth |
| 2015/0293328 A1 | 10/2015 | Laroia |
| 2016/0125570 A1 | 5/2016 | Macmillan |
| 2016/0309134 A1 | 10/2016 | Venkataraman |
| 2018/0262683 A1 | 9/2018 | Meler |
| 2021/0082086 A1* | 3/2021 | Bichu ........................ G06T 7/33 |

* cited by examiner

CIRCULAR STITCHING OF IMAGES

CROSS-REFERENCE TO RELATED APPLICATION

This application claims priority to and the benefit of U.S. Provisional Patent Application No. 62/901,918, filed Sep. 18, 2019, the entire disclosure of which is hereby incorporated by reference.

TECHNICAL FIELD

This disclosure relates to circular stitching of images.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images (e.g., still images or video frames) may include spatially adjacent or overlapping content. Accordingly, systems, methods, and apparatus for capturing, processing, and/or encoding images, video, or both may be advantageous.

SUMMARY

Disclosed herein are implementations of circular stitching of images.

In a first aspect, the subject matter described in this specification can be embodied in systems that include: a first image sensor configured to capture images, a second image sensor configured to capture images, and a processing apparatus that is configured to: access a first image captured using the first image sensor; access a second image captured using the second image sensor; determine a cost table for a circular stitching boundary that includes overlapping regions of the first image and the second image, wherein the cost table is indexed by a longitude around the circular stitching boundary and indexed by a binocular disparity value, and wherein the cost table has a width corresponding to a circumference of the circular stitching boundary; determine an extended disparity profile based on a periodic extension of the cost table and a smoothness criterion, wherein the extended disparity profile has a length greater than the width of the cost table; determine a binocular disparity profile of a length equal to the width of the cost table based on a contiguous subsequence of the extended disparity profile; and stitch the first image and the second image using the binocular disparity profile to obtain a combined image.

In a second aspect, the subject matter described in this specification can be embodied in methods that include accessing a first image captured using a first image sensor; accessing a second image captured using a second image sensor; determining a cost table for a circular stitching boundary that includes overlapping regions of the first image and the second image, wherein the cost table is indexed by a longitude around the circular stitching boundary and indexed by a binocular disparity value, and wherein the cost table has a width corresponding to a circumference of the circular stitching boundary; determining an extended disparity profile based on a periodic extension of the cost table and a smoothness criterion, wherein the extended disparity profile has a length greater than the width of the cost table, wherein the extended disparity profile is constrained to start and end at a same disparity value; determining a binocular disparity profile of a length equal to the width of the cost table based on a contiguous subsequence of the extended disparity profile; and stitching the first image and the second image using the binocular disparity profile to obtain a combined image.

In a third aspect, the subject matter described in this specification can be embodied in a non-transitory computer-readable storage medium. The non-transitory computer-readable storage medium may include executable instructions that, when executed by a processor, cause performance of operations, including: accessing a first image captured using a first image sensor; accessing a second image captured using a second image sensor; determining a cost table for a circular stitching boundary that includes overlapping regions of the first image and the second image, wherein the cost table is indexed by a longitude around the circular stitching boundary and indexed by a binocular disparity value, and wherein the cost table has a width corresponding to a circumference of the circular stitching boundary; determining an extended disparity profile based on a periodic extension of the cost table and a smoothness criterion, wherein the extended disparity profile has a length greater than the width of the cost table, wherein the extended disparity profile is constrained to start at a disparity value of zero and end at a disparity value of zero; determining a binocular disparity profile of a length equal to the width of the cost table based on a contiguous subsequence of the extended disparity profile; and stitching the first image and the second image using the binocular disparity profile to obtain a combined image.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
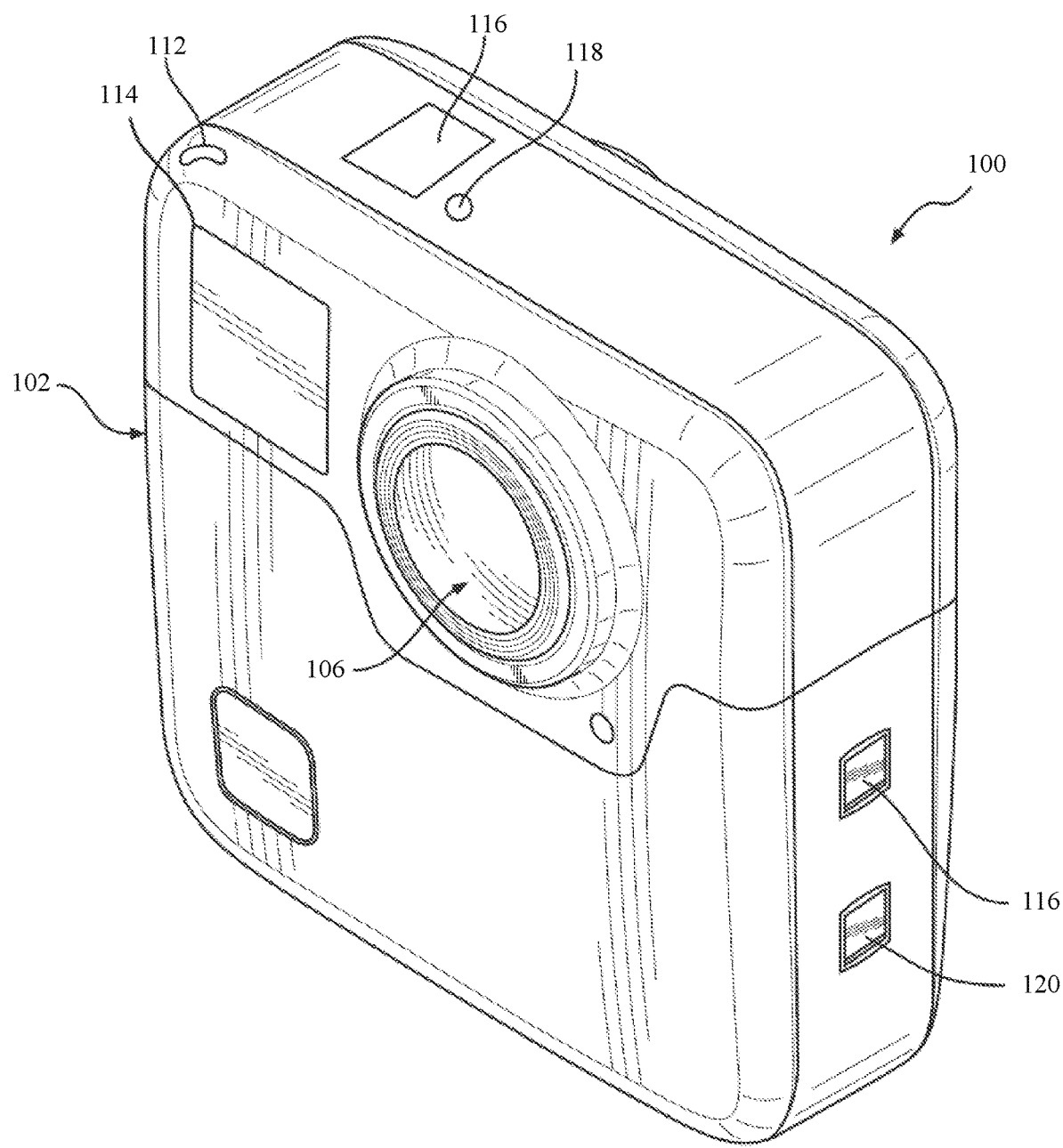
FIGS. 1A-B are isometric views of another example of an image capture device.

This document includes disclosure of systems, apparatus, and methods for stitching images captured with a circular stitching boundary. Continuity of a combined image along a stitching boundary can have a significant impact on the perceived image quality of the combined image. Stitching two images may entail determining binocular disparity estimates for various offsets along a stitching boundary based on comparison of the two images. It is advantageous to stitch using a sequence of binocular disparity estimates that vary smoothly along the length of the stitching boundary, while also closely matching the actually parallax distortion encountered in a pair of overlapping images.

Determining the best set of binocular disparity estimates for two partially overlapping images may be posed as a shortest path search given comparison information for sections of the two images along the stitching boundary. For example, a shortest path search can be describes as:
- given a two-dimensional cost table C of size W*H (W is the width, H is the height) associating a cost C[i,j] for each i in range [0 . . . W−1] and j in range [0 . . . H−1]
- find the function f which associates a vertical index f(i) in the range [0 . . . H−1] for each horizontal index in the range [0 . . . W−1] such that:
  - sum(C[i,f(i)] for i in [0 . . . W−1])+sum(|f(i−1)−f(i)| for i in range [1 . . . W−1]) is minimal
  - |f(i−1)−f(i)|<B for all i in range [1 . . . W−1], B being a given bound
  - optionally imposes boundary conditions such as f(0)=F0 and f(W−1)=F1, where F0 and F1 are predefined constants in range [0 . . . H−1]

A variety of shortest path search algorithms may be applied to find a binocular disparity profile given a table of cost estimates for a set of candidate disparity values at each position along the length of a stitching boundary. For example, these algorithms may be used to generate a stitching disparity profile in a spherical camera where a table C consists of a measure of the difference between patches from the front and back images for a longitude i under the assumption of a candidate disparity j. This is because to generate a good looking image, we need to generate such a profile that simultaneously minimizes the difference between the front and back images at the border at which they are stitched and the smoothness of the disparity profile along the length stitching boundary. However, in the case of hyper-hemispherical images being stitched to form a spherical image, the longitudes are from a circle and not from a segment with an independent beginning and end. Thus, the question of the circular shortest path is the following:
- given a two-dimensional cost table C of size W*H (W is the width, H is the height) associating a cost C[i,j] for each i in range [0 . . . W−1] and j in range [0 . . . H−1]
- find the function f which associates a vertical index f(i) in the range [0 . . . H−1] for each horizontal index in the range [0 . . . W−1] such that:
  - sum(C[i,f(i)] for i in [0 . . . W−1])+sum(|f(i−1)−f(i)| for i in range [1 . . . W−1])+|f(W−1)−f(0)| is minimal
  - |f(i−1)−f(i)|<B for all i in range [1 . . . W−1] and |f(W−1)−f(0)|<B, B being a given bound A useful approximation of the ideal solution to this circular shortest path question may be found using the following technique:
- given a two-dimensional cost table C of size W*H (W is the width, H is the height) associating a cost C[i,j] for each i in range [0 . . . W−1] and j in range [0 . . . H−1]
- Define a new width W' larger than W (for example enlarge W by 20%, or W'=1.2*W)
- Define a new two-dimensional cost table D of size W'*H where D[i,j]=C[i % W,j] for all i in range [0 . . . W'−1] and j in range [0 . . . H−1]
- Find f' using the shortest path algorithm applied to cost table D under the constraint that f'(0)=0 and f'(W'−1)=0
- Determine I0 the smallest i in range [0 . . . W'−W−1] such that c[I0] is satisfied, where c[i] is defined as f'(i+W)≤f'(i). I0 exists since c[W'−W−1] is satisfied as f'(W'−W−1+W)=f'(W'−1)=0.
- Define f by:

$$f(i)=f'(i+W) \text{ if } i<I0$$

$$f(i)=f'(i) \text{ if } i \geq I0$$

Here, D is a periodic extension of the cost table C for candidate binocular disparity values at various longitudes around the circumference of the stitching boundary. The sequence f (i) is an extended disparity profile that may be found using any of a variety of shortest path algorithms applied to D. A purpose of this periodic extension is to mask out the effect of the lack of continuity constraint between first and last indices in the standard shortest path algorithm. The determination of I0 guarantees this continuity. Then f is a good approximation of the circular shortest path solution and can efficiently be used to generate binocular disparity profiles for stitching in spherical cameras using only marginally more computing resources than a non-circular shortest path.

Image capture devices implementing this technique to determine binocular disparity profiles for stitching around circular stitching boundaries may have advantages, such as, for example, achieving high image quality with lower computational complexity compared to using an ideal solution of the circular shortest path problem. For example, image capture devices using this technique may use less power and/or provide higher image quality spherical images compared to earlier devices.

Figure 1B:
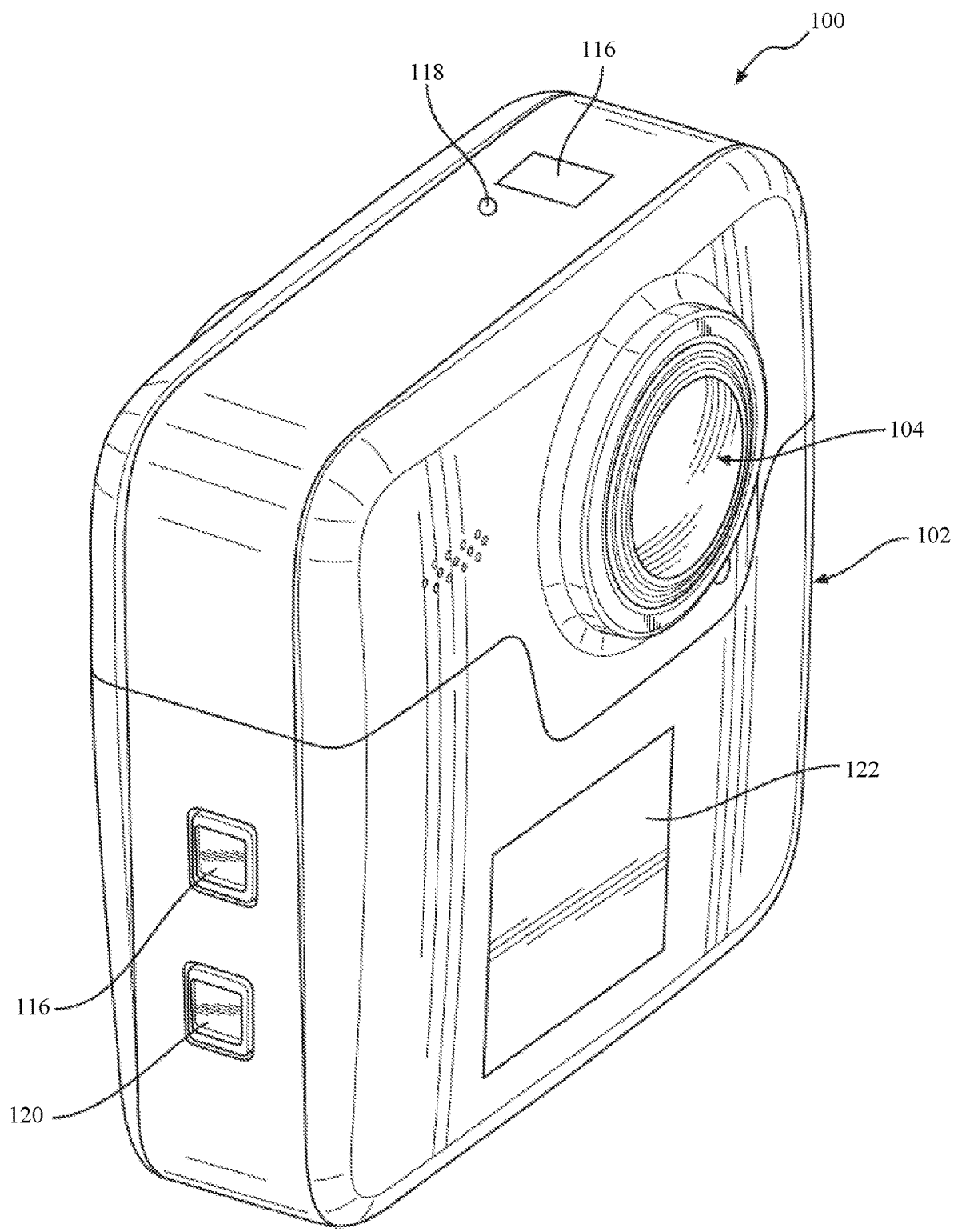

FIGS. 1A-B illustrate an example of an image capture device 100. The image capture device 100 includes a body 102 and two camera lenses 104, 106 disposed on opposing surfaces of the body 102, for example, in a back-to-back or Janus configuration.

The image capture device may include electronics (e.g., imaging electronics, power electronics, etc.) internal to the body 102 for capturing images via the lenses 104, 106 and/or performing other functions. The image capture device may include various indicators such as an LED light 112 and an LCD display 114.

The image capture device 100 may include various input mechanisms such as buttons, switches, and touchscreen mechanisms. For example, the image capture device 100 may include buttons 116 configured to allow a user of the image capture device 100 to interact with the image capture device 100, to turn the image capture device 100 on, and to otherwise configure the operating mode of the image capture device 100. In an implementation, the image capture device 100 includes a shutter button and a mode button. It should be appreciated, however, that, in alternate embodiments, the image capture device 100 may include additional buttons to support and/or control additional functionality.

The image capture device 100 may also include one or more microphones 118 configured to receive and record audio signals (e.g., voice or other audio commands) in conjunction with recording video.

The image capture device 100 may include an I/O interface 120 and an interactive display 122 that allows for interaction with the image capture device 100 while simultaneously displaying information on a surface of the image capture device 100.

The image capture device 100 may be made of a rigid material such as plastic, aluminum, steel, or fiberglass. In some embodiments, the image capture device 100 described herein includes features other than those described. For example, instead of the I/O interface 120 and the interactive display 122, the image capture device 100 may include additional interfaces or different interface features. For example, the image capture device 100 may include additional buttons or different interface features, such as interchangeable lenses, cold shoes and hot shoes that can add functional features to the image capture device 100, etc.

Figure 1C:
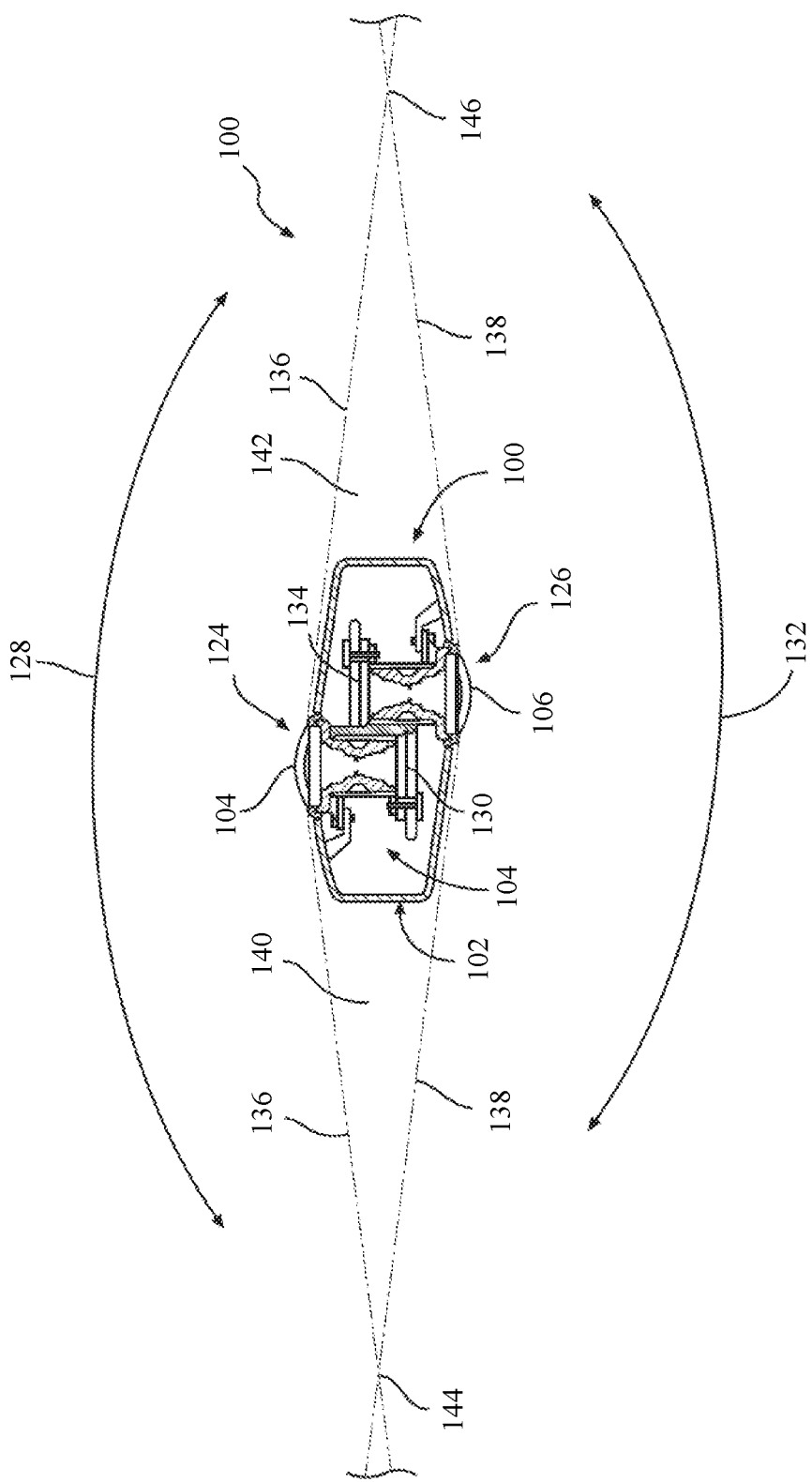
FIG. 1C is a cross-sectional view of the image capture device of FIGS. 1A-B.

FIG. 1C is a cross-sectional view of the image capture device 100 of FIGS. 1A-B. The image capture device 100 is configured to capture spherical images, and accordingly, includes a first integrated sensor lens assembly 124 and a second integrated sensor lens assembly 126. The first integrated sensor lens assembly 124 defines a first field-of-view 128 as shown in FIG. 1C and includes the lens 104 that receives and directs light onto a first image sensor 130.

Similarly, the second integrated sensor lens assembly 126 defines a second field-of-view 132 as shown in FIG. 1C and includes the lens 106 that receives and directs light onto a second image sensor 134. To facilitate the capture of spherical images, the integrated sensor lens assemblies 124, 126 (and related components) may be arranged in a back-to-back (Janus) configuration such that the lenses 104, 106 face in generally opposite directions.

The fields-of-view 128, 132 of the lenses 104, 106 are shown above and below boundaries 136, 138, respectively. Behind the first lens 104, the first image sensor 130 may capture a first hyper-hemispherical image plane from light entering the first lens 104, and behind the second lens 106, the second image sensor 134 may capture a second hyper-hemispherical image plane from light entering the second lens 106.

One or more areas, such as blind spots 140, 142 may be outside of the fields-of-view 128, 132 of the lenses 104, 106 so as to define a "dead zone." In the dead zone, light may be obscured from the lenses 104, 106 and the corresponding image sensors 130, 134, and content in the blind spots 140, 142 may be omitted from capture. In some implementations, the integrated sensor lens assemblies 124, 126 may be configured to minimize the blind spots 140, 142.

The fields-of-view 128, 132 may overlap. Stitch points 144, 146, proximal to the image capture device 100, at which the fields-of-view 128, 132 overlap may be referred to herein as overlap points or stitch points. Content captured by the respective lenses 104, 106, distal to the stitch points 144, 146, may overlap.

Images contemporaneously captured by the respective image sensors 130, 134 may be combined to form a combined image. Combining the respective images may include correlating the overlapping regions captured by the respective image sensors 130, 134, aligning the captured fields-of-view 128, 132, and stitching the images together to form a cohesive combined image.

A slight change in the alignment, such as position and/or tilt, of the lenses 104, 106, the image sensors 130, 134, or both, may change the relative positions of their respective fields-of-view 128, 132 and the locations of the stitch points 144, 146. A change in alignment may affect the size of the blind spots 140, 142, which may include changing the size of the blind spots 140, 142 unequally.

Incomplete or inaccurate information indicating the alignment of the integrated sensor lens assemblies 124, 126, such as the locations of the stitch points 144, 146, may decrease the accuracy, efficiency, or both of generating a combined image. In some implementations, the image capture device 100 may maintain information indicating the location and orientation of the lenses 104, 106 and the image sensors 130, 134 such that the fields-of-view 128, 132, stitch points 144, 146, or both may be accurately determined, which may improve the accuracy, efficiency, or both of generating a combined image.

The lenses 104, 106 may be laterally offset from each other, may be off-center from a central axis of the image capture device 100, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 100 may be close to the length of a single lens barrel as opposed to twice the length of a single lens barrel as in a back-to-back configuration. Reducing the lateral distance between the lenses 104, 106 may improve the overlap in the fields-of-view 128, 132.

Images or frames captured by the integrated sensor lens assemblies 124, 126 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 2:
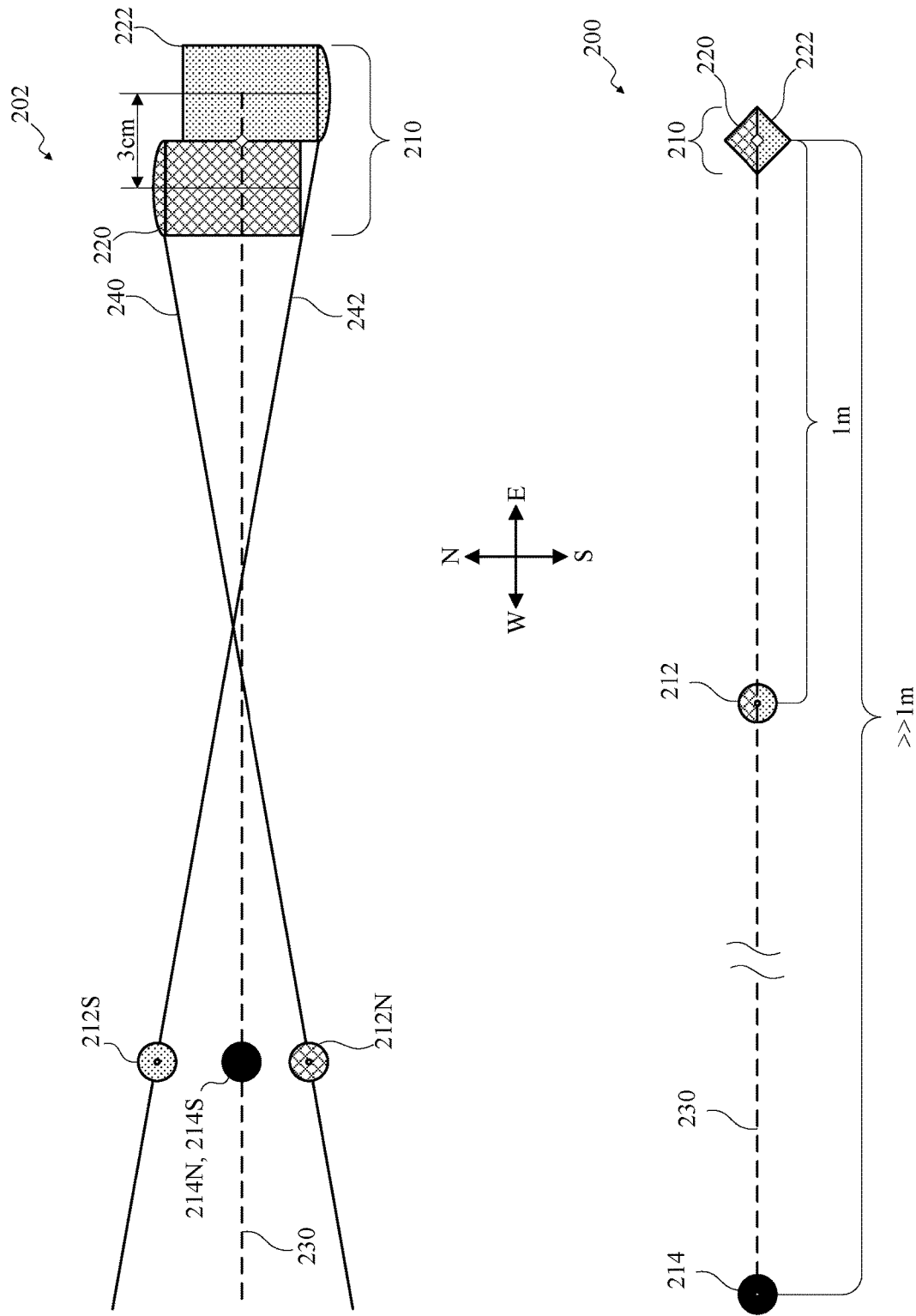
FIG. 2 is a diagram of an example of spatial and field-of-view representations of overlapping field-of-view for two integrated sensor lens assemblies of an image capture device.

FIG. 2 is a diagram of an example of spatial and field-of-view representations of overlapping field-of-view for two integrated sensor lens assemblies of an image capture device. FIG. 2 is shown as oriented with north at the top and east at the right and is described with reference to longitude and latitude for simplicity and clarity; however, any orientation may be used, direction, longitude, and latitude are described with reference to the image capture apparatus or the respective image capture devices and may differ from geographic analogs.

FIG. 2 includes a lower portion showing a spatial representation 200 of an image capture apparatus 210 including a near object 212 and a far object 214 and an upper portion showing a corresponding field-of-view representation 202 for the image capture apparatus 210 including near object content 212N as captured by the north facing integrated sensor lens assembly 220, near object content 212S as captured by the south facing integrated sensor lens assembly 222, far object content 214N as captured by the north facing integrated sensor lens assembly 220, and far object content 214S as captured by the south facing integrated sensor lens assembly 222.

In the spatial representation 200, the image capture apparatus 210, which may be a multi-face image capture apparatus, such as the image capture device 100 of FIGS. 1A-C, is represented by a diamond. In some implementations, the multi-face image capture apparatus 210 may include two or more integrated sensor lens assemblies 220, 222, such as the image capture device 310 shown in FIG. 3A, which may have overlapping field-of-view. A north facing integrated sensor lens assembly 220 is indicated as a triangle with a cross hatched background, and a south facing integrated sensor lens assembly 222 is indicated as a triangle with a stippled background. An equator 230, which may be a midpoint between the two integrated sensor lens assemblies 220, 222, is indicated by a broken line.

In the spatial representation 200, the near object 212, which may be captured, in whole or in part, in one or more images captured by the integrated sensor lens assemblies 220, 222, is shown as a circle, along the equator 230, having a north half with a cross-hatched background and a south half having a stippled background. The near object 212 may be a relatively short distance from the image capture apparatus 210, such as 1 meter (1 m) as shown. The far object 214, which may be captured, in whole or in part, in one or more images captured by the integrated sensor lens assemblies 220, 222, is shown as a black circle along the equator 230. The far object 214 may be a relatively long distance from the image capture apparatus 210, such as a distance much greater than 1 meter (>>1 m) as shown. For example, the far object 214 may be near the horizon.

In the field-of-view representation 202, the north facing integrated sensor lens assembly 220 is shown on the left of the image capture apparatus 210, facing north, with a cross hatched background, and the corresponding north field-of-view is partially represented as including content above, such as north of, a north field-of-view border line 240. The south facing integrated sensor lens assembly 222 of the image capture apparatus 210 is shown on the right, facing south, with a stippled background, and the corresponding south field-of-view is partially represented as including content below, such as south of, a south field-of-view border line 242.

In some implementations, the respective fields-of-view for the integrated sensor lens assemblies 220, 222 may include a defined N° longitudinal dimension, such as 360° of longitude, and may include a defined N° lateral dimension, which may be greater than 180° of latitude. For example, the north facing integrated sensor lens assembly 220 may have a field-of-view that extends 10° latitude below the equator 230 as represented by the north field-of-view border line 240, and the south facing integrated sensor lens assembly 222 may have a field-of-view that extends 10° latitude above the equator 230, as represented by the south field-of-view border line 242. The overlapping region may include 360° of longitude and may include 20° of latitude, which may include a range of 10° north latitude to 10° south latitude.

In some implementations, the integrated sensor lens assemblies 220, 222 may be physically offset along one or more spatial axis. For example, as shown in the field-of-view representation 202, the north facing integrated sensor lens assembly 220 is offset vertically (north-south) and horizontally. In the example shown in FIG. 2, the horizontal, or longitudinal, offset between the integrated sensor lens assemblies 220, 222, or between the respective optical centers of the integrated sensor lens assemblies 220, 222, is 3 cm; however, other offsets may be used.

As shown in the spatial representation 200, the near object 212 is positioned along the equator 230 and is positioned relatively proximal to the image capture apparatus 210, such as 1 meter (1 m). The far object 214 is positioned along the equator, and is positioned relatively distal (>>1 m) from the image capture apparatus 210. For simplicity and clarity, the distance of the far object 214 may be, as an example, three kilometers from the spatial center of the image capture apparatus 210 as indicated by the small white diamond in the image capture apparatus 210.

As shown in the field-of-view representation 202, the optical center of the north facing integrated sensor lens assembly 220 may be offset from the spatial center of the image capture apparatus 210 horizontally by a defined amount, such as by 1.5 cm west laterally, and vertically by a defined amount, such as by 1.5 cm north longitudinally, and the optical center of the south facing integrated sensor lens assembly 222 may be offset from the spatial center of the image capture apparatus 210 horizontally by a defined amount, such as by 1.5 cm east laterally, and vertically by a defined amount, such as by 1.5 cm south longitudinally.

In the field-of-view representation 202, the near object content 212N as captured by the north facing integrated sensor lens assembly 220, corresponding to the near object 212 shown in the spatial representation 200, the near object content 212S as captured by the south facing integrated sensor lens assembly 222, corresponding to the near object 212 shown in the spatial representation 200, the far object content 214N as captured by the north facing integrated sensor lens assembly 220, corresponding to the far object 214 shown in the spatial representation 200, and the far object content 214S as captured by the south facing integrated sensor lens assembly 222, corresponding to the far object 214 shown in the spatial representation 200, are shown vertically aligned at an intermediate distance from the image capture apparatus 210 to indicate that distance information for the near object 212 and the far object 214 may be unavailable independent of analyzing the images.

In the field-of-view representation 202, the far object content 214N as captured by the north facing integrated sensor lens assembly 220 and the far object content 214S as captured by the south facing integrated sensor lens assembly 222 are shown along the equator 230 indicating that the position of the far object content 214N as captured by the north facing integrated sensor lens assembly 220 may be indistinguishable from the position of the far object content 214S as captured by the south facing integrated sensor lens assembly 222. For example, the far object 214, as shown in the spatial representation 200, may be approximately 2,999.9850000375 meters at an angle of approximately 0.00028648° from the optical center of the north facing integrated sensor lens assembly 220 and may be approximately 3,000.0150000375 meters at an angle of approximately 0.00028647° from the optical center of the south facing integrated sensor lens assembly 222. The angular difference of approximately one hundred-millionth of a degree between the location of the far object 214 relative to the optical center of the north facing integrated sensor lens assembly 220 and the location of the far object 214 relative to the optical center of the south facing integrated sensor lens assembly 222 may correspond to a difference of zero pixels in the corresponding images.

The position of the near object 212 may differ in the respective images captured by the integrated sensor lens assemblies 220, 222. In the field-of-view representation 202, the near object content 212N as captured by the north facing integrated sensor lens assembly 220 is shown with a cross-hatched background below the equator 230 indicating that the position of the near object content 212N as captured by the north facing integrated sensor lens assembly 220 may be slightly below the equator 230, such as 1° south latitude, and the near object content 212S as captured by the south facing integrated sensor lens assembly 222 is shown with a stippled background above the equator 230 indicating that the position of the near object content 212S as captured by the south facing integrated sensor lens assembly 222 may be slightly above the equator 230, such as 1° north latitude. For example, the near object 212, as shown in the spatial representation 200, may be approximately 1.01511083 meters at an angle of approximately 0.846674024° from the optical center of the north facing integrated sensor lens assembly 220, and may be approximately 0.985114207 meters at an angle of approximately 0.872457123° from the optical center of the south facing integrated sensor lens assembly 222. The angular difference of approximately 1.72° between the location of the near object 212 relative to the optical center of the north facing integrated sensor lens assembly 220 and the location of the near object 212 relative to the optical center of the south facing integrated sensor lens assembly 222 may correspond to a difference of one or more pixels in the corresponding images.

In some implementations, images captured by the integrated sensor lens assemblies 220, 222 may be combined to generate a combined image wherein overlapping regions and transitions between overlapping regions, such as portions corresponding to field-of-view boundaries 240, 242, are visually cohesive. In some implementations, combining images may include aligning overlapping regions of the images to adjust for differences between the relative locations of the respective integrated sensor lens assemblies 220, 222 and the content captured by the images. In some implementations, aligning overlapping regions of images may be based on the physical alignment of the respective integrated sensor lens assemblies 220, 222 of the image capture apparatus 210, the distance between the respective integrated sensor lens assemblies 220, 222 of the image capture apparatus 210 and the content captured by the images, or both.

Figure 3:
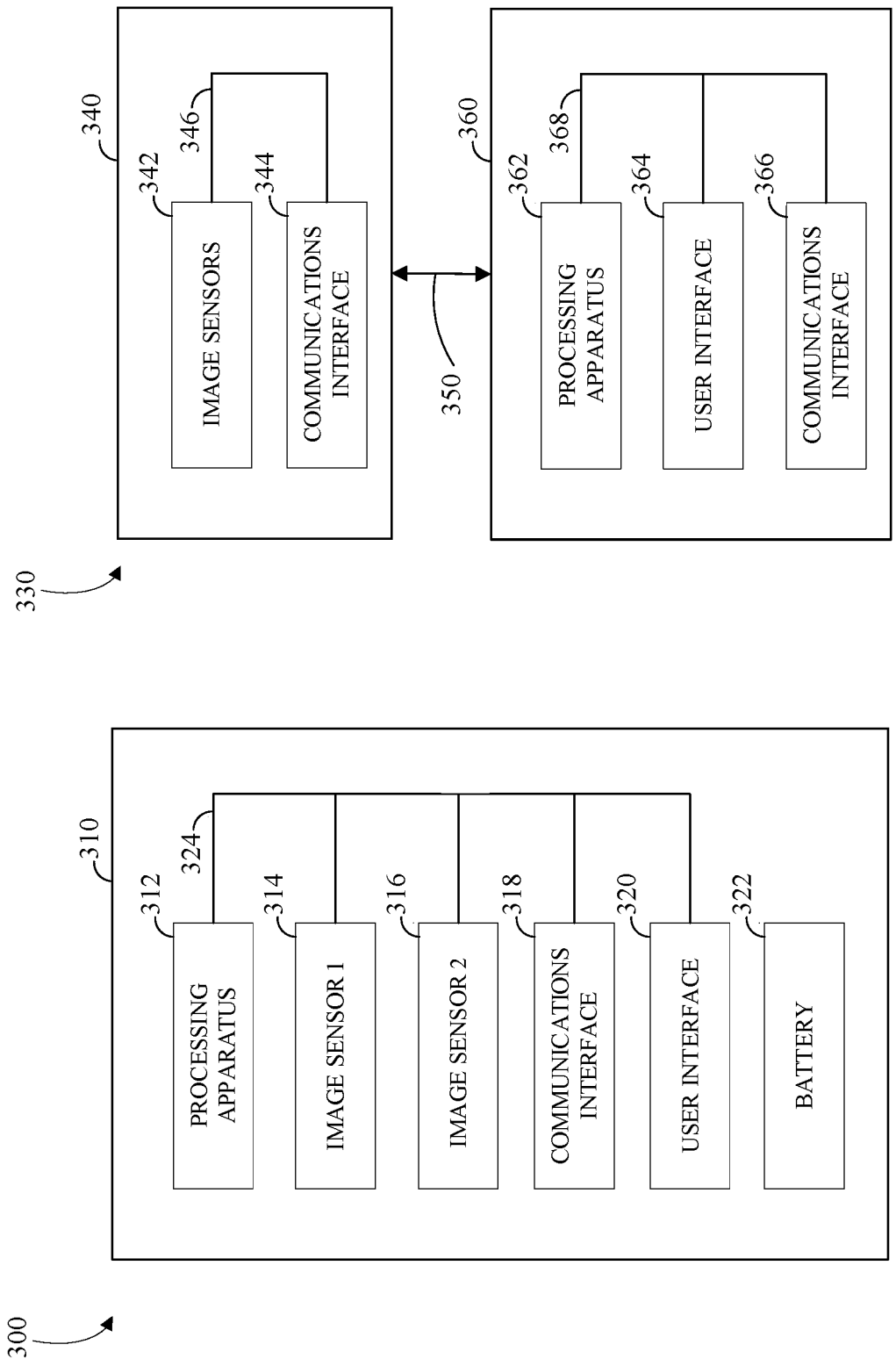
FIGS. 3A-B are block diagrams of examples of image capture systems.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 100 shown in FIGS. 1A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

For example, the first image sensor 314 may be attached to the second image sensor 316 and oriented in an opposite direction with respect to the second image sensor 316, such that the first image sensor 314 and the second image sensor 316 have partially overlapping fields of view. For example, the first image sensor 314 and the second image sensor 316 may components of respective integrated sensor lens assemblies (e.g., the integrated sensor lens assemblies 220, 222) that are oriented in opposite directions (e.g., in a Janus configuration). In some implementations, the image capture device 310 includes a first fisheye lens attached to the first image sensor 314 such that the first image sensor 314 is positioned to detect light incident through the first fisheye lens, and a second fisheye lens attached to the second image sensor 316 such that the second image sensor 316 is positioned to detect light incident through the second fisheye lens.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 5:
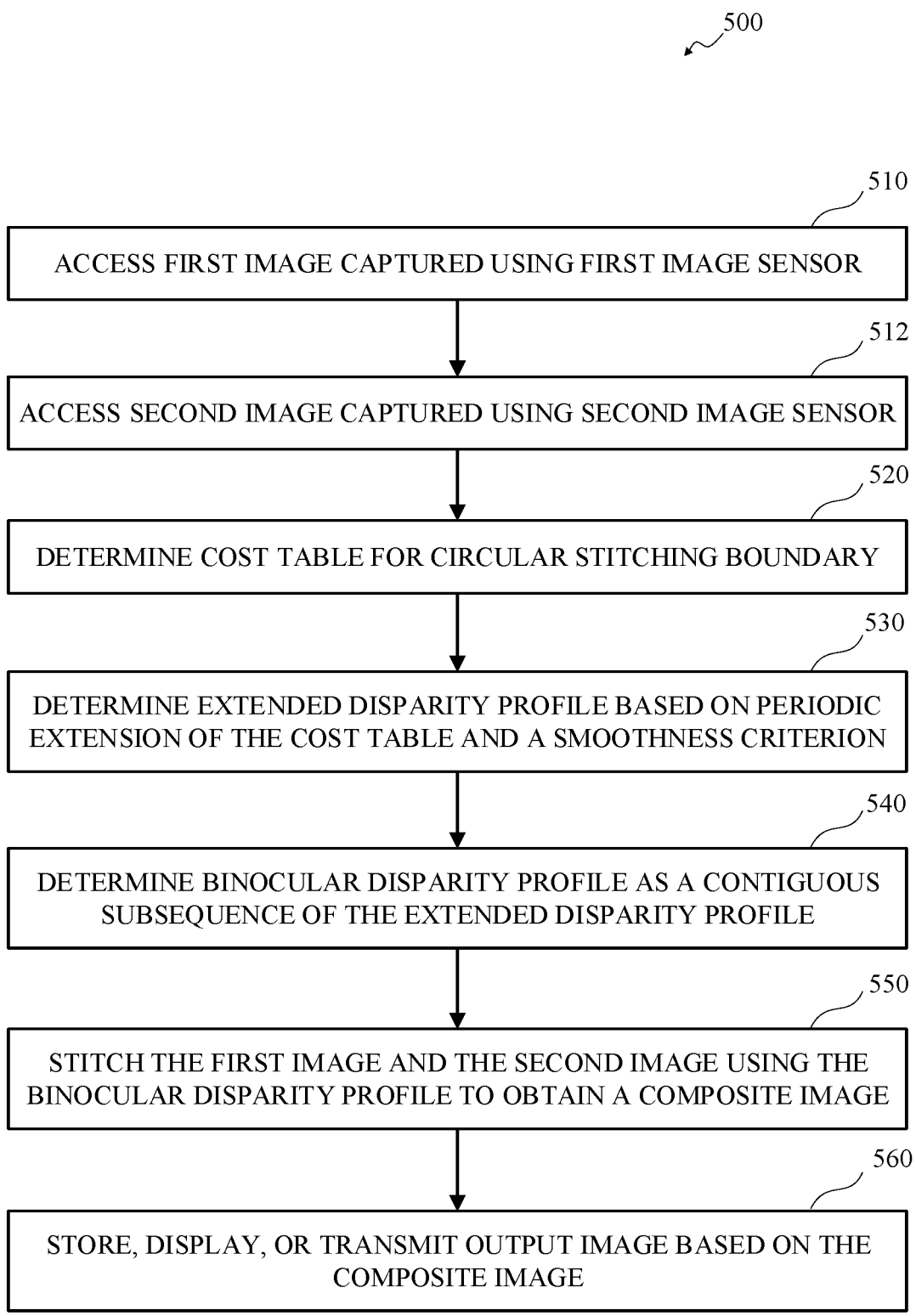
FIG. 5 is a flowchart of an example of a process for stitching images with a circular stitching boundary.

The image capture system 300 may be used to implement some or all of the processes described in this disclosure, such as the process 500 described in FIG. 5.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes image sensors 342 that are configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensors 342. The processing apparatus 362 may be configured to perform image signal processing (e.g., filtering, tone mapping, stitching, and/or encoding) to generate output images based on image data from the image sensors 342.

The image sensors 342 are configured to detect light of a certain spectrum (e.g., the visible spectrum or the infrared spectrum) and convey information constituting an image as electrical signals (e.g., analog or digital signals). For example, the image sensors 342 may include CCDs or active pixel sensors in a CMOS. The image sensors 342 may detect light incident through a respective lens (e.g., a fisheye lens). In some implementations, the image sensors 342 includes digital-to-analog converters. Image signals from the image sensors 342 may be passed to other components of the image capture device 340 via a bus 346.

For example, the image sensors 342 may include a first image sensor attached to a second image sensor and oriented in an opposite direction with respect to the second image sensor, such that the first image sensor and the second image sensor have partially overlapping fields of view. For example, the first image sensor and the second image sensor may be components of respective integrated sensor lens assemblies (e.g., the integrated sensor lens assemblies 220, 222) that are oriented in opposite directions (e.g., in a Janus configuration). In some implementations, the image capture device 340 includes a first fisheye lens attached to the first image sensor such that the first image sensor is positioned to detect light incident through the first fisheye lens, and a second fisheye lens attached to the second image sensor such that the second image sensor is positioned to detect light incident through the second fisheye lens.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data captured using the image sensors 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture system 330 may be used to implement some or all of the processes described in this disclosure, such as the process 500 of FIG. 5.

Figure 4:
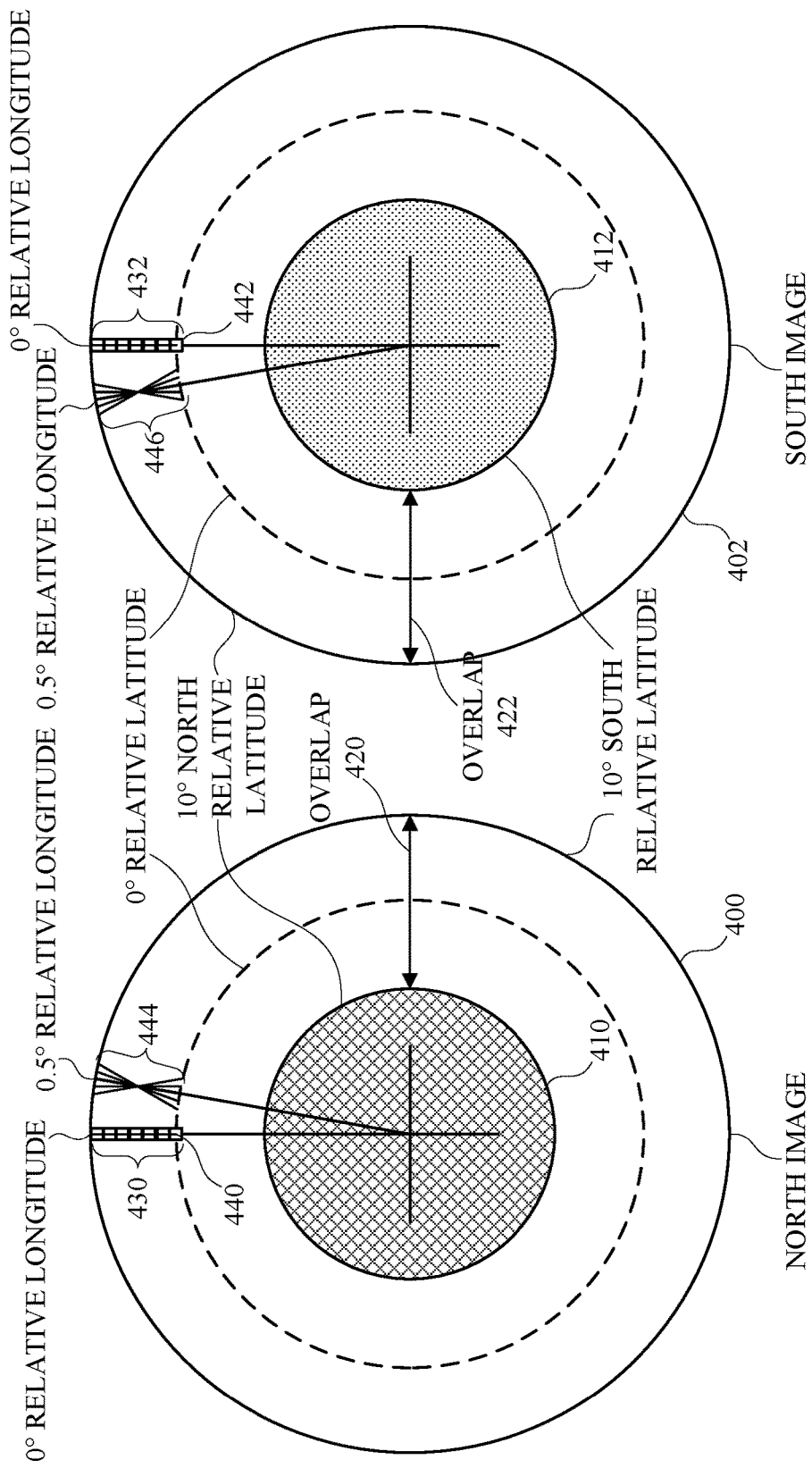
FIG. 4 is a diagram of elements of aligning overlapping image regions for a pair images captured with an image capture device.

FIG. 4 is a diagram of elements of aligning overlapping image regions for a pair images captured with an image capture device. FIG. 4 shows a north circular frame 400 and a south circular frame 402. The north circular frame 400 includes a non-overlapping region 410 indicated with a cross-hatched background, and an overlapping region 420. The south circular frame 402 includes a non-overlapping region 412 indicated with a stippled background, and an overlapping region 422. In some implementations, the longitudes in a frame, such as the north frame 400 as shown, may be oriented clockwise, and the longitudes in a corresponding frame, such as the south frame 402 as shown, may be oriented counterclockwise.

The overlapping regions 420, 422 of the north circular frame 400 and the south circular frame 402 may be aligned. For example, in the north circular frame 400, blocks 430, such as a 13×13 block of pixels, may be identified along an alignment path 440 beginning at 0° relative longitude and 0° relative latitude and ending along the edge of the north circular frame 400, which may be at a distal relative latitude, such as 10° south latitude, as shown. In the south circular frame 402, corresponding blocks 432 may be identified along a corresponding alignment path 442 beginning at 0° relative longitude and 0° relative latitude and ending along the edge of the south circular frame 402, which may be at 10° north latitude, as shown. Correspondence metrics may be determined based on differences between the identified blocks 430 from the north circular frame 400 and the spatially corresponding blocks 432 from the south circular frame 402.

In the north circular frame 400, candidate alignment paths 444 are shown for the 0.5° relative longitude, each path beginning at 0° relative latitude and ending along the edge of the north circular frame 400, to indicate that correspondence metrics may be determined at each defined distance longitudinally and to indicate that for each respective longitude, multiple candidate alignment paths 444 may be evaluated. For example, a first candidate alignment path from the candidate alignment paths 444 may be orthogonal to the equator, which may be aligned along the respective longitude, and each other candidate alignment path from the candidate alignment paths 444 may be angularly offset relative to the longitude as shown. FIG. 4 is not to scale. Although the blocks are shown as adjacent, the blocks may overlap horizontally, vertically, or both. Although seven blocks and two alignments paths are shown for simplicity, any number of blocks and alignment paths may be used. For example, 720 alignment paths, which may correspond with approximately 0.5° longitudinal intervals, may be used, and 150 blocks per alignment path, which may correspond with approximately 0.1° latitude intervals, may be used. Corresponding candidate alignment paths 446 are shown in the south circular frame 402. In some implementations, a number, or cardinality, of points, such as pixels, indicated by each respective candidate alignment path 444 may be a defined cardinality, such as 150 points, and each respective point from a candidate alignment path 444 may be offset, or shifted, from a corresponding point in another candidate alignment path 444 parallel to the equator. In some implementations, a candidate alignment path 444, or a portion thereof, for a longitude may overlap a candidate alignment path, or a portion thereof, for an adjacent longitude.

In some implementations, a camera alignment model may be based on the physical orientation of elements of the image capture device, such as the physical alignment of lenses, image sensors, or both. Changes in the physical orientation of elements of one or more of the image capture devices having overlapping fields-of-view may cause misalignment such that aligning overlapping image regions based on a misaligned camera alignment model may inaccurately or inefficiently align image elements, such as pixels. For example, misalignment of image capture devices may occur during fabrication such that the alignment of image capture devices having overlapping field-of-view may differ from an expected alignment. In another example, the physical orientation of elements of an image capture device may change, such as in response to physical force, temperature variation, material aging or deformation, atmospheric pressure, or any other physical or chemical process, or combination of processes, that may change image capture device alignment. In some implementations, camera alignment model calibration may include updating, adjusting, or modifying a camera alignment model based on identified changes in the physical orientation of elements of one or more of the respective image capture devices.

FIG. 5 is a flowchart of an example of a process 500 for stitching images with a circular stitching boundary. The process 500 includes accessing 510 a first image captured using a first image sensor; accessing 512 a second image captured using a second image sensor; determining 520 a cost table for a circular stitching boundary that includes overlapping regions of the first image and the second image, with a width corresponding to the circumference of the circular stitching boundary and a height correspond to a number of candidate binocular disparity values; determining 530 an extended disparity profile based on a periodic extension of the cost table and a smoothness criterion, wherein the extended disparity profile has a length greater than the width of the cost table; determining 540 a binocular disparity profile of a length equal to the width of the cost table based on a contiguous subsequence of the extended disparity profile; stitching 550 the first image and the second image using the binocular disparity profile to obtain a combined image; and storing, displaying, or transmitting an output image that is based on the combined image. For example, the process 500 may be implemented using the image capture device 100 of FIGS. 1A-C. For example, the process 500 may be implemented using the image capture system 300 of FIG. 3A. For example, the process 500 may be implemented using the image capture system 330 of FIG. 3B.

The process 500 includes accessing 510 a first image captured using a first image sensor (e.g., the first image sensor 130 or the first image sensor 314). The first image sensor may be part of an image capture device (e.g., the image capture device 100, the image capture apparatus 210, the image capture device 310, or the image capture device 340). For example, the first image may be a hyper-hemispherical image. For example, the first image may be accessed 510 from the first image sensor via a bus (e.g., the bus 324). In some implementations, the first image may be accessed 510 via a communications link (e.g., the communications link 350). For example, the first image may be accessed 510 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the first image may be accessed 510 via communications interface 366. For example, the first image may be accessed 510 via a front ISP that performs some initial processing on the accessed 510 first image. For example, the first image may represent each pixel value in a defined format, such as in a RAW image signal format, a YUV image signal format, or a compressed format (e.g., an MPEG or JPEG compressed bitstream). For example, the first image may be stored in a format using the Bayer color mosaic pattern. In some implementations, the first image may be a frame of video. In some implementations, the first image may be a still image.

The process 500 includes accessing 512 a second image captured using a second image sensor (e.g., the second image sensor 130 or the second image sensor 316). The second image sensor may be part of an image capture device (e.g., the image capture device 100, the image capture apparatus 210, the image capture device 310, or the image capture device 340). In some implementations, the first image sensor is attached to the second image sensor and oriented in an opposite direction with respect to the second image sensor, such that the first image sensor and the second image sensor have partially overlapping fields of view. For example, the second image may be a hyper-hemispherical image. For example, the first image and the second image may overlap as described in relation to the north circular frame 400 and the south circular frame 402 depicted in FIG. 4. For example, the second image may be accessed 512 from the second image sensor via a bus (e.g., the bus 324). In some implementations, the second image may be accessed 512 via a communications link (e.g., the communications link 350). For example, the second image may be accessed 512 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the second image may be accessed 512 via communications interface 366. For example, the second image may be accessed 512 via a front ISP that performs some initial processing on the accessed 512 second image. For example, the second image may represent each pixel value in a defined format, such as in a RAW image signal format, a YUV image signal format, or a compressed format (e.g., an MPEG or JPEG compressed bitstream). For example, the second image may be stored in a format using the Bayer color mosaic pattern. In some implementations, the second image may be a frame of video. In some implementations, the second image may be a still image.

determine a cost table for a circular stitching boundary that includes overlapping regions of the first image and the second image, wherein the cost table is indexed by a longitude around the circular stitching boundary and indexed by a binocular disparity value, and wherein the cost table has a width corresponding to a circumference of the circular stitching boundary The process 500 includes determining 520 a cost table for a circular stitching boundary that includes overlapping regions (e.g., overlapping regions 420, 422) of the first image and the second image. The cost table may be indexed by a longitude around the circular stitching boundary and indexed by a binocular disparity value. The cost table has a width (W) corresponding to a circumference of the circular stitching boundary. For example, the circular stitching boundary may be partitioned into slices corresponding to respective longitudes around the circumference of the circular stitching boundary. In some implementations, each column of the cost table corresponds to a different longitude around the circular stitching boundary, while each row of the cost table corresponds a different candidate binocular disparity value. For example, an entry of the cost table may be determined 520 based on a correspondence metric (e.g., a cross-correlation) that compares blocks of pixels (e.g., 430 and 432) from the first image and the second image along an alignment path at the longitude corresponding to the column index of the entry using a displacement along the alignment path corresponding to the candidate binocular disparity corresponding to the row index of the entry. The cost table may have a height (H) (i.e., a number of rows) corresponding to the number of candidate binocular disparity values that will be searched. In some implementations, the height of the cost table corresponds to a range of binocular disparity values to be searched. In some implementations, the cost table entries are inversely proportional to a correspondence metric. For example, the cost table may be of the form:

$C[i,j]$ for each $i$ in range $[0 \ldots W-1]$ and $j$ in range $[0 \ldots H-1]$ The process 500 includes determining 530 an extended disparity profile based on a periodic extension of the cost table and a smoothness criterion. The extended disparity profile has a length (L) greater than the width (W) of the cost table. An entry in the extended disparity profile may represent a selection of one of the candidate binocular disparity values from a column of the periodic extension of the cost table for the longitude corresponding to that column. For example, a shortest path algorithm with a cost function, which includes a term based on the periodic extension of the cost table and a term based on the smoothness criterion, may be used to determine 530 the extended disparity profile as sequence of length L. In some implementations, the extended disparity profile is constrained to start and end at a same disparity value. For example, the extended disparity profile may be constrained to start at a disparity value of zero and end at a disparity value of zero. An example of an extended disparity profile is plotted in FIG. 7. The length L of the extended disparity profile may be determined as a compromise between computational cost and resulting quality. A large L will favor image quality at the expense of larger computational cost while a small L will favor computational cost at the expense of lower image quality. In some implementations, the length (L) of the extended disparity profile is between ten percent and thirty percent greater than the width (W) of the cost table. For example, the length (L) of the extended disparity profile may be twenty percent greater than the width (W) of the cost table. In some implementations, the length (L) of the extended disparity profile is approximately twice the width (W) of the cost table. The periodic extension of the cost table may be of width L and of height H. For example, the periodic extension of the cost table may be expressed as:

$D[i,j]=C[i \% W, j]$ for all $i$ in range $[0 \ldots L-1]$ and $j$ in range $[0 \ldots H-1]$, where % is a modulo operator.

For example, the smoothness criterion may be a sum of differences between consecutive elements of the extended disparity profile. In some implementations, a cost function used to determine 530 the extended disparity profile includes the term:

$\text{sum}(|f'(i-1)-f'(i)|$ for $i$ in range $[1 \ldots L-1])$ where f'(i) is the ith entry of the extended disparity profile. In some implementations, the extended disparity profile values f'(i) are integer index values in the range $[0 \ldots H-1]$. In some implementations, the extended disparity profile values f'(i) are candidate binocular disparity values corresponding to a respective row index. For example, the cost function used with a shortest path algorithm to determine 530 the extended disparity profile may be of the form:

$\text{sum}(D[i,f'(i)]$ for $i$ in $[0 \ldots L-1])+\text{sum}(|f'(i-1)-f'(i)|$ for $i$ in range $[1 \ldots L-1])$ For example, the extended disparity profile may be determined 530 using a shortest path algorithm that enforces a constraint on the maximum change between consecutive elements of the extended disparity profile. In some implementations, determining 530 the extended disparity profile includes determining 530 the extended disparity profile subject to a constraint that all differences between consecutive elements of the extended disparity profile are less than a maximum disparity change (B). For example, the constraint may be expressed as:

$|f'(i-1)-f'(i)|<B$ for all $i$ in range $[1 \ldots L-1]$

The process 500 includes determining 540 a binocular disparity profile of a length equal to the width (W) of the cost table based on a contiguous subsequence of the extended disparity profile. For example, the process 600 of FIG. 6 may be implemented to determine 540 the binocular disparity profile. In some implementations, the binocular disparity profile is selected as a contiguous subsequence with length W of the extended disparity profile to minimize the magnitude of the difference between the first and last entries of the binocular disparity profile, i.e., $|f(W-1)-f(0)|$ In other words, a selection index I0 may be found that minimizes $|f'(I0+W)-f'(I0)|$. The resulting binocular disparity profile may encode a binocular disparity value for each of W longitudes around the circumference of the circular stitching boundary. For example, a binocular disparity value may equivalently be encoded as an index (e.g., in the range $[0 \ldots H-1]$) that identifies a candidate binocular disparity value associated with the index or as the raw binocular disparity value (e.g., stored as a floating point or a fixed point number).

The process 500 includes stitching 550 the first image and the second image using the binocular disparity profile to obtain a combined image. For example, the first image and the second image may be stitched 550 to correct for parallax distortion by lining up pixels from the first image and the second image that correspond to the same objects appearing in both fields of view before blending the pixel values from the first image and the second image in the circular stitching boundary. In some implementations, the combined image is a spherical image.

The process 500 includes storing, displaying, or transmitting 560 an output image that is based on the combined image. For example, the output image may be transmitted 560 to an external device (e.g., a personal computing device) for display or storage. For example, the output image may be the same as the combined image. For example, the combined image may be compressed using an encoder (e.g., an MPEG encoder) to determine the output image. For example, the output image may be transmitted 560 via the communications interface 318. For example, the output image may be displayed 560 in the user interface 320 or in the user interface 364. For example, the output image may be stored 560 in memory of the processing apparatus 312 or in memory of the processing apparatus 362.

Figure 6:
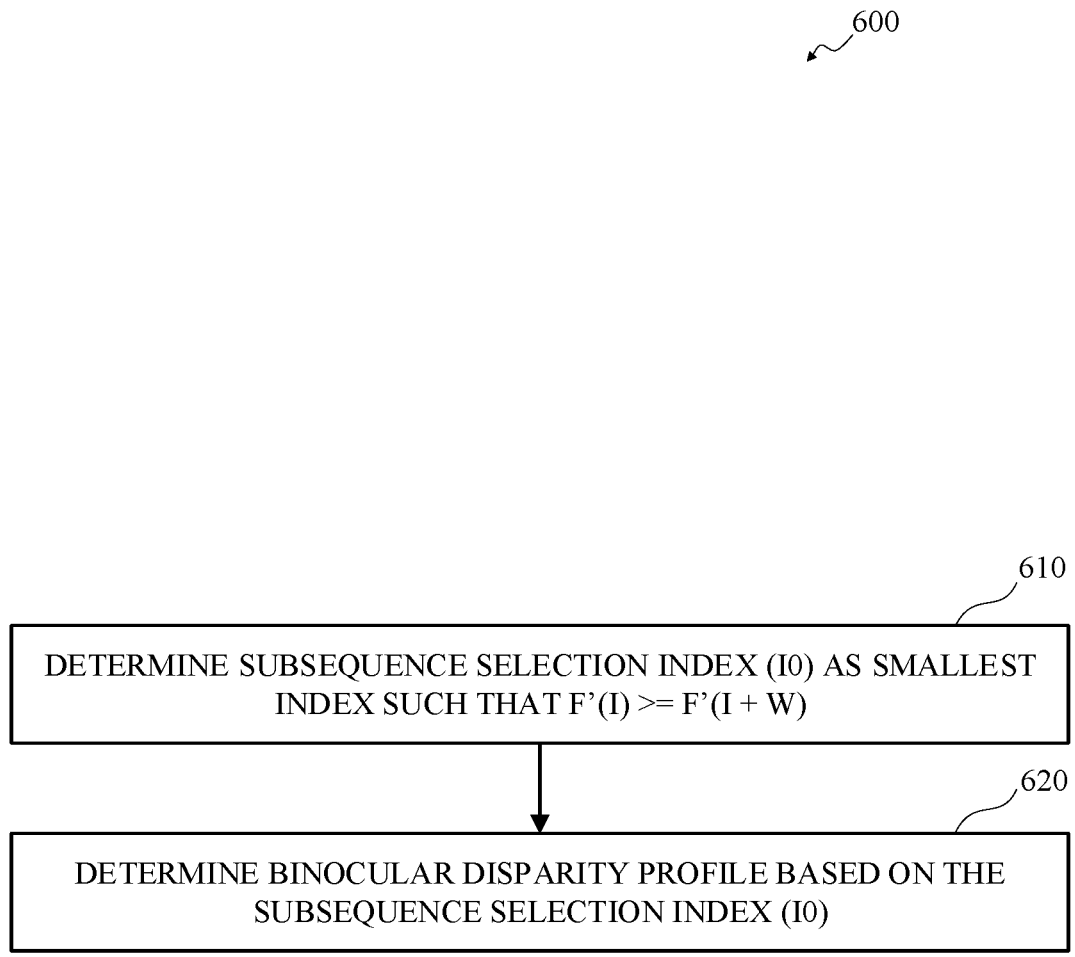
FIG. 6 is a flowchart of an example of a process for determining a binocular disparity profile as a continuous subsequence of an extended disparity profile.

FIG. 6 is a flowchart of an example of a process 600 for determining a binocular disparity profile as a continuous subsequence of an extended disparity profile. The process 600 includes determining 610 a subsequence selection index as a smallest non-negative index such that the extend disparity profile has a value at the subsequence selection index that is greater than or equal to the value of the extended disparity profile at the subsequence selection index plus the width of the cost table; and determining 620 the binocular disparity profile based on the subsequence selection index. For example, the process 600 may be implemented using the image capture device 100 of FIGS. 1A-C. For example, the process 600 may be implemented using the image capture system 300 of FIG. 3A. For example, the process 600 may be implemented using the image capture system 330 of FIG. 3B.

The process 600 includes determining 610 a subsequence selection index as a smallest non-negative index such that the extend disparity profile has a value at the subsequence selection index that is greater than or equal to the value of the extended disparity profile at the subsequence selection index plus the width of the cost table. For example, the subsequence selection index (I0) may be determined 610 as the smallest i in range [0 . . . L−W−1] such that f'(I0+W) ≤f'(I0), where f'(i) is the ith value of the extended disparity profile. Note that, where the extend disparity profile has been constrained to end at zero, I0 exists since the index L−W−1 fulfills this condition, as f'(L−W−1+W)=f'(L−1)=0.

The process 600 includes determining 620 the binocular disparity profile based on the subsequence selection index. For example, the binocular disparity profile (f) may be determined 620 as:

$$f(i)=f'(i+W), \text{ if } i<I0$$

$$f(i)=f'(i), \text{ if } i \geq I0$$

where W is width of the cost table and the length of the binocular disparity profile and may correspond to a number of longitude slices of the circular stitching boundary that will be used for stitching the first image and the second image.

Figure 7:
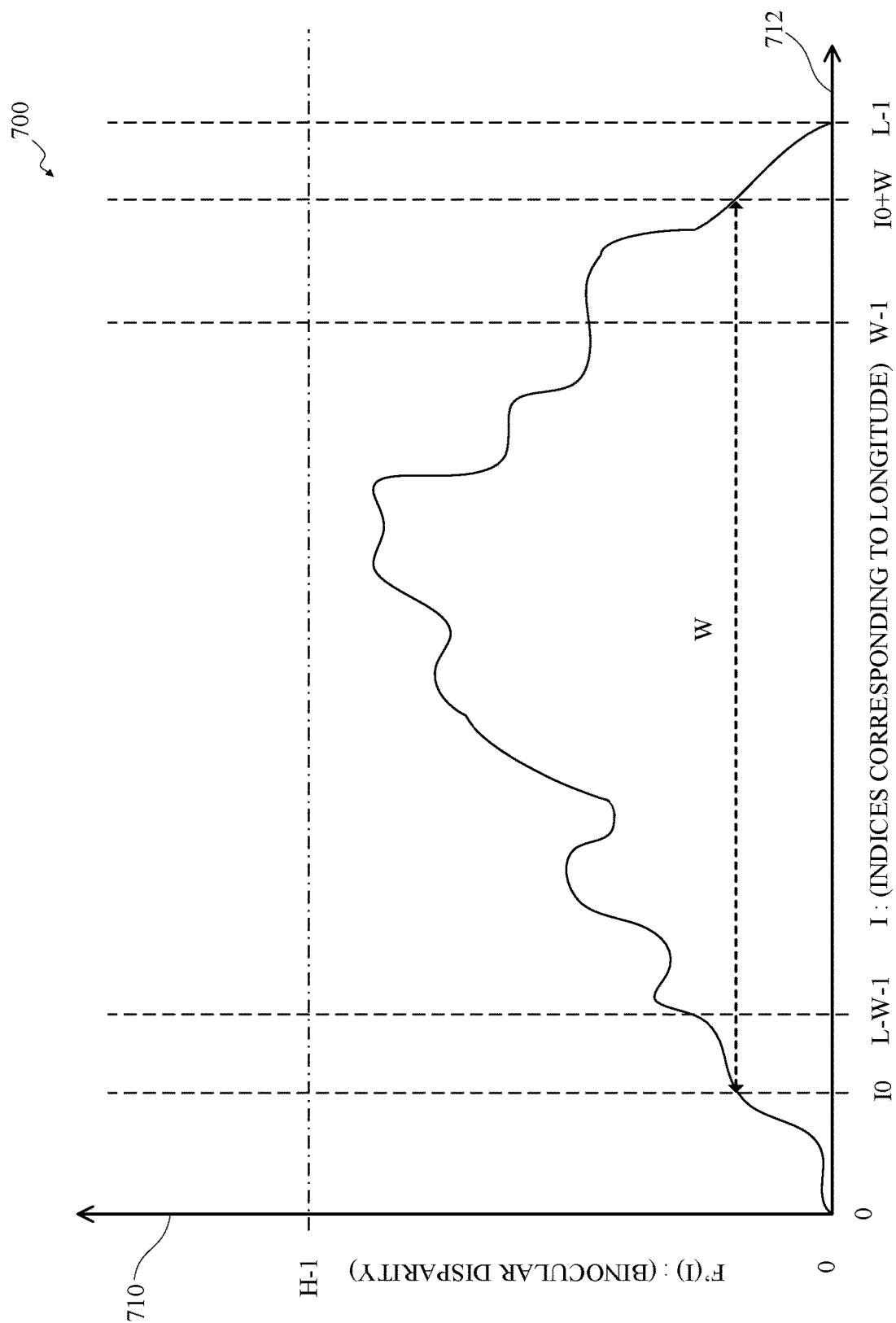
FIG. 7 is a plot of an example of an extended disparity profile with notations to illustrate selection of a binocular disparity profile from the extended disparity profile.

FIG. 7 is a plot of an example of an extended disparity profile 700 with notations to illustrate selection of a binocular disparity profile from the extended disparity profile. The y axis 710 shows the entry values of the extended disparity profile 700, which in this example are indices in the range [0 . . . H−1] that can be mapped to corresponding candidate binocular disparity values. The x axis 712 shows the indices (I) of the extended disparity profile in the range [0 . . . L−1], which correspond to respective longitudes around the circumference of the circular stitching boundary with the range [0 . . . W−1] corresponding 360 degrees of longitude and the range [W . . . L−1] corresponding to a periodic extension of the cost table (e.g., repeating the first L−W longitude columns of the cost table).

The extended disparity profile 700 has been determined subject to the constraint that the start (f'(0)) and end (f'(L−1)) of the extended disparity profile 700 are zero. A subsequence selection index (I0) is determined 610 as the smallest index such that f'(I0+W)≤f'(I0). The binocular disparity profile is then determined 620 based on the contiguous subsequence of length W identified by the subsequence selection index (I0). In this example, the values of the extended disparity profile f'(i) for indices i in the range [I0 . . . I0+W−1] are used to determine 620 the binocular disparity profile.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. For example, a non-transitory computer-readable storage medium may include executable instructions that, when executed by a processor, cause performance of an operations to implement the process 500 of FIG. 5 and/or the process 600 of FIG. 6.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
a first image sensor configured to capture images;
a second image sensor configured to capture images; and
a processing apparatus that is configured to:
    access a first image captured using the first image sensor;
    access a second image captured using the second image sensor;
    determine a cost table for a circular stitching boundary that includes overlapping regions of the first image and the second image, wherein the cost table is indexed by a longitude around the circular stitching boundary and indexed by a binocular disparity value, and wherein the cost table has a width corresponding to a circumference of the circular stitching boundary;
    determine an extended disparity profile based on a periodic extension of the cost table and a smoothness criterion, wherein the extended disparity profile has a length greater than the width of the cost table;
    determine a binocular disparity profile of a length equal to the width of the cost table based on a contiguous subsequence of the extended disparity profile; and
    stitch the first image and the second image using the binocular disparity profile to obtain a combined image.

2. The system of claim 1, wherein the extended disparity profile is constrained to start at a disparity value of zero and end at a disparity value of zero.

3. The system of claim 1, wherein the processing apparatus that is configured to:
determine a subsequence selection index as a smallest non-negative index such that the
extend disparity profile has a value at the subsequence selection index that is greater than or equal to the value of the extended disparity profile at the subsequence selection index plus the width of the cost table; and determine the binocular disparity profile based on the subsequence selection index.

4. The system of claim 1, wherein the length of the extended disparity profile is between ten percent and thirty percent greater than the width of the cost table.

5. The system of claim 1, wherein the smoothness criterion is a sum of differences between consecutive elements of the extended disparity profile.

6. The system of claim 1, wherein the processing apparatus that is configured to:
determine the extended disparity profile subject to a constraint that all differences between consecutive elements of the extended disparity profile are less than a maximum disparity change.

7. The system of claim 1, wherein the first image sensor is attached to the second image sensor and oriented in an opposite direction with respect to the second image sensor, such that the first image sensor and the second image sensor have partially overlapping fields of view.

8. The system of claim 7, comprising:
a first fisheye lens attached to the first image sensor such that the first image sensor is positioned to detect light incident through the first fisheye lens; and
a second fisheye lens attached to the second image sensor such that the second image sensor is positioned to detect light incident through the second fisheye lens.

9. The system of claim 1, wherein a height of the cost table corresponds to a range of binocular disparity values to be searched.

10. The system of claim 1, wherein the combined image is a spherical image.

11. A method comprising:
accessing a first image captured using a first image sensor;
accessing a second image captured using a second image sensor;
determining a cost table for a circular stitching boundary that includes overlapping regions of the first image and the second image, wherein the cost table is indexed by a longitude around the circular stitching boundary and indexed by a binocular disparity value, and wherein the cost table has a width corresponding to a circumference of the circular stitching boundary;
determining an extended disparity profile based on a periodic extension of the cost table and a smoothness criterion, wherein the extended disparity profile has a length greater than the width of the cost table, wherein the extended disparity profile is constrained to start and end at a same disparity value;
determining a binocular disparity profile of a length equal to the width of the cost table based on a contiguous subsequence of the extended disparity profile; and
stitching the first image and the second image using the binocular disparity profile to obtain a combined image.

12. The method of claim 11, wherein the same disparity value for the start and end of the extended disparity profile is zero.

13. The method of claim 11, comprising:
determining a subsequence selection index as a smallest non-negative index such that the extend disparity profile has a value at the subsequence selection index that is greater than or equal to the value of the extended disparity profile at the subsequence selection index plus the width of the cost table; and
determining the binocular disparity profile based on the subsequence selection index.

14. The method of claim 11, wherein the length of the extended disparity profile is between ten percent and thirty percent greater than the width of the cost table.

15. The method of claim 11, wherein the smoothness criterion is a sum of differences between consecutive elements of the extended disparity profile.

16. The method of claim 11, wherein determining the extended disparity profile comprises:
determining the extended disparity profile subject to a constraint that all differences between consecutive elements of the extended disparity profile are less than a maximum disparity change.

17. The method of claim 11, wherein a height of the cost table corresponds to a range of binocular disparity values to be searched.

18. The method of claim 11, wherein the combined image is a spherical image.

19. The method of claim 11, comprising:
storing, displaying, or transmitting an output image that is based on the combined image.

20. A non-transitory computer-readable storage medium storing executable instructions that, when executed by a processor, cause performance of operations, comprising:
accessing a first image captured using a first image sensor;
accessing a second image captured using a second image sensor;
determining a cost table for a circular stitching boundary that includes overlapping regions of the first image and the second image, wherein the cost table is indexed by a longitude around the circular stitching boundary and indexed by a binocular disparity value, and wherein the cost table has a width corresponding to a circumference of the circular stitching boundary;
determining an extended disparity profile based on a periodic extension of the cost table and a smoothness criterion, wherein the extended disparity profile has a length greater than the width of the cost table, wherein the extended disparity profile is constrained to start at a disparity value of zero and end at a disparity value of zero;
determining a binocular disparity profile of a length equal to the width of the cost table based on a contiguous subsequence of the extended disparity profile; and
stitching the first image and the second image using the binocular disparity profile to obtain a combined image.

* * * * *